(12) United States Patent
Shimomura

(10) Patent No.: US 10,034,287 B2
(45) Date of Patent: Jul. 24, 2018

(54) COMMUNICATIONS METHOD, COMMUNICATIONS SYSTEM, CONTROL APPARATUS, AND RADIO APPARATUS

(71) Applicant: FUJITSU LIMITED, Kawasaki-shi, Kanagawa (JP)

(72) Inventor: Tsuyoshi Shimomura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 121 days.

(21) Appl. No.: 14/984,587

(22) Filed: Dec. 30, 2015

(65) Prior Publication Data

US 2016/0119929 A1  Apr. 28, 2016

Related U.S. Application Data

(63) Continuation of application No. PCT/JP2013/069227, filed on Jul. 12, 2013.

(51) Int. Cl.
*H04W 72/04* (2009.01)
*H04W 16/14* (2009.01)
(Continued)

(52) U.S. Cl.
CPC ....... *H04W 72/0453* (2013.01); *H04W 16/14* (2013.01); *H04W 48/16* (2013.01);
(Continued)

(58) Field of Classification Search
CPC ......... H04W 72/0453; H04W 72/0486; H04W 72/005; H04W 72/082; H04W 48/16;
(Continued)

(56) References Cited

U.S. PATENT DOCUMENTS 6,546,062 B1 *  4/2003  Du ....................... H04B 1/7075
                                                     370/328
2009/0191906 A1   7/2009  Abedi
(Continued)

FOREIGN PATENT DOCUMENTS

JP  2000-031887 A  1/2000
JP  2007-088940 A  4/2007
(Continued)

OTHER PUBLICATIONS

Yang et al., IEEE 802.19-1110067r0, "Wireless Coexistence" NICT, Jul. 13, 2011.
(Continued)

*Primary Examiner* — Phuc Tran
(74) *Attorney, Agent, or Firm* — Myers Wolin, LLC

(57) ABSTRACT

A communications method includes transmitting by a radio apparatus, where the radio apparatus transmits to a control apparatus, first information indicating a wireless scheme that the radio apparatus can use in any one among wireless communication and wireless broadcasting; extracting and transmitting by the control apparatus, where the control apparatus extracts from frequency information correlating wireless schemes and available frequencies, a frequency that corresponds to the wireless scheme indicated by the first information transmitted by the radio apparatus and transmits to the radio apparatus, second information indicating the extracted frequency; and performing by the radio apparatus, any one among the wireless communication and the wireless broadcasting, using the frequency indicated by the second information transmitted by the control apparatus.

8 Claims, 19 Drawing Sheets

(51) Int. Cl.
*H04W 48/16* (2009.01)
*H04W 72/00* (2009.01)
*H04W 72/08* (2009.01)
*H04L 27/00* (2006.01)
*H04W 88/02* (2009.01)

(52) U.S. Cl.
CPC ..... *H04W 72/005* (2013.01); *H04W 72/0486* (2013.01); *H04W 72/082* (2013.01); *H04L 27/0006* (2013.01); *H04W 88/02* (2013.01)

(58) Field of Classification Search
CPC .... H04W 16/14; H04W 88/02; H04L 27/0006
See application file for complete search history.

(56) References Cited

U.S. PATENT DOCUMENTS

| | | | |
|---|---|---|---|
| 2010/0034097 A1 | 2/2010 | Nitta et al. | |
| 2013/0016760 A1* | 1/2013 | Shellhammer | H04W 16/14 375/146 |
| 2013/0121182 A1 | 5/2013 | Hegge | |
| 2013/0155971 A1* | 6/2013 | Shellhammer | H04W 72/04 370/329 |
| 2013/0310061 A1* | 11/2013 | Sawai | H04W 72/00 455/454 |
| 2014/0016571 A1* | 1/2014 | Yucek | H04L 1/0071 370/329 |

FOREIGN PATENT DOCUMENTS

| | | |
|---|---|---|
| JP | 2009-177816 A | 8/2009 |
| JP | 2012-147259 A | 8/2012 |
| JP | 2012-175616 A | 9/2012 |
| JP | 2013-106209 A | 5/2013 |
| WO | 2008-129659 A1 | 10/2008 |

OTHER PUBLICATIONS

International Search Report issued for corresponding International Patent Application No. PCT/JP2013/069227 dated Aug. 6, 2013.

Partial English translation of the Written Opinion of the International Searching Authority issued for International Patent Application No. PCT/JP2013/069227, dated Aug. 6, 2013.

* cited by examiner

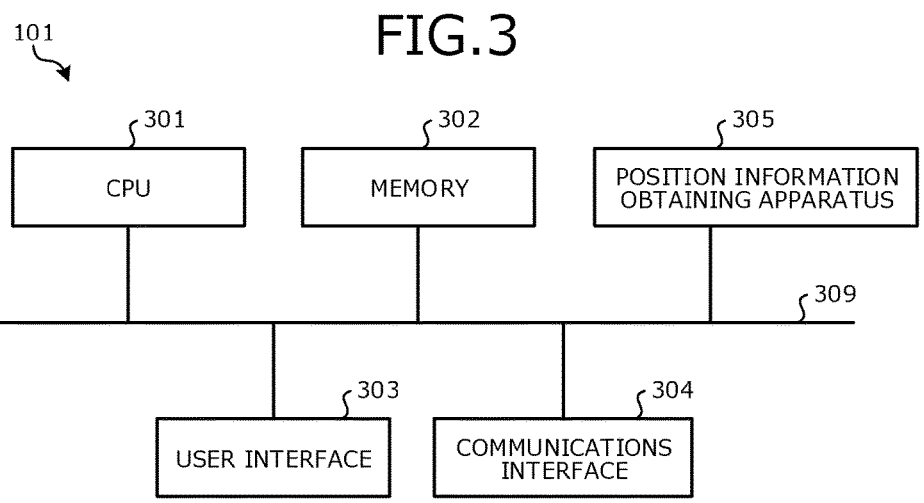
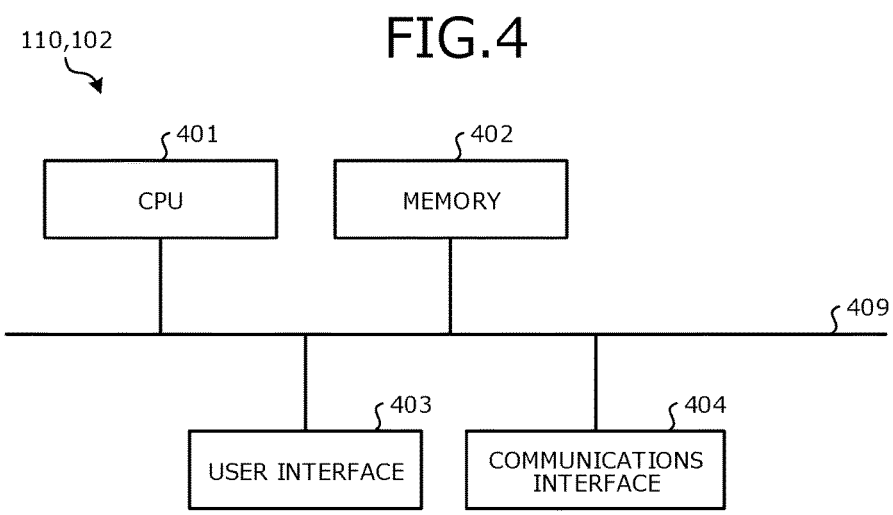

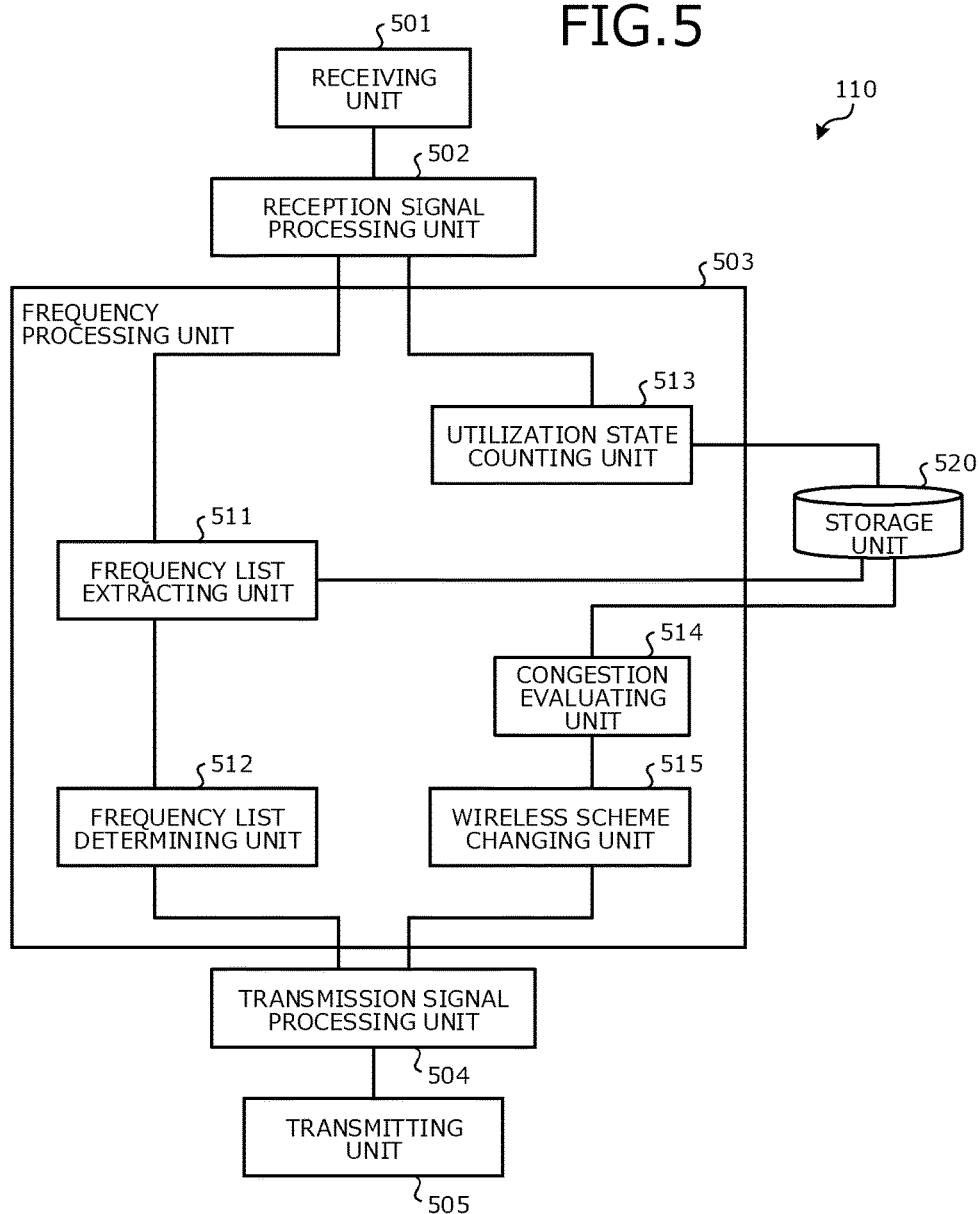

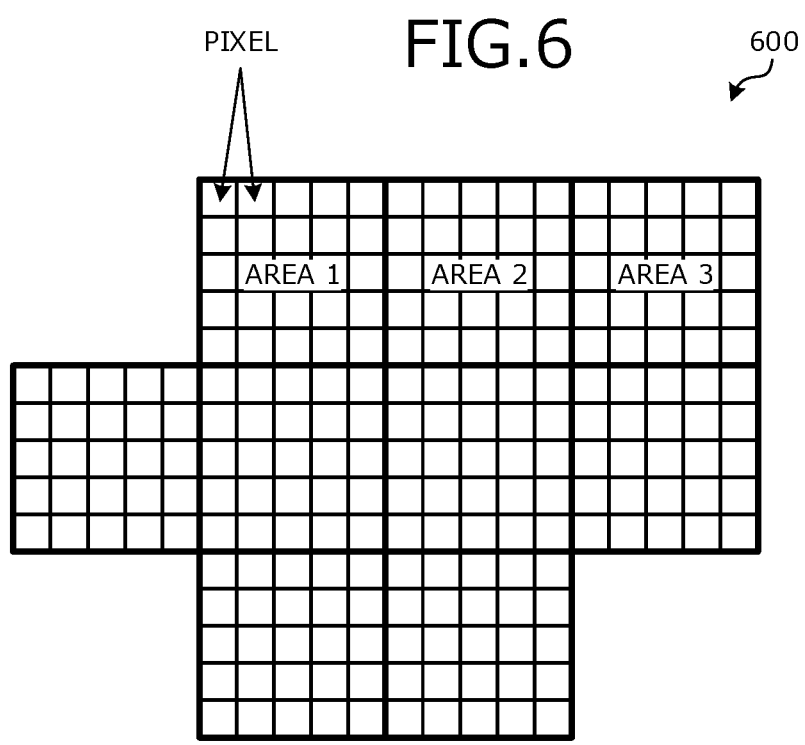

| AREA 1 | | | | | | | | |
|---|---|---|---|---|---|---|---|---|
| FREQUENCY BANDWIDTH | UPPER LIMIT [MHz] | LOWER LIMIT [MHz] | PIXELS | | | | | |
| | | | 1 | 2 | 3 | 4 | ⋮ | k |
| f1 | x1 | x2 | 0 | 1 | 0 | 1 | ⋮ | 0 |
| f2 | x3 | x4 | 1 | 0 | 0 | 1 | ⋮ | 0 |
| ⋮ | ⋮ | ⋮ | ⋮ | ⋮ | ⋮ | ⋮ | ⋮ | ⋮ |
| fn | xi | xj | 0 | 0 | 1 | 1 | ⋮ | 0 |

1000

| AREA 1 | | | |
|---|---|---|---|
| FREQUENCY | OCCUPANCY LEVEL | | |
| | WIRELESS SCHEME a | WIRELESS SCHEME b | WIRELESS SCHEME c |
| f1 | P1(a) | P1(b) | P1(c) |
| f2 | P2(a) | P2(b) | P2(c) |
| f3 | P3(a) | P3(b) | P3(c) |

| AREA 1 | | | |
|---|---|---|---|
| FREQUENCY | OCCUPANCY LEVEL | | |
| | WIRELESS SCHEME a | WIRELESS SCHEME b | WIRELESS SCHEME c |
| f1 | 40 | 30 | 5 |
| f2 | 40 | 15 | 10 |
| f3 | 20 | 45 | 10 |

| AREA 1 | | | |
|---|---|---|---|
| FREQUENCY | OCCUPANCY LEVEL | | |
| | WIRELESS SCHEME a | WIRELESS SCHEME b | WIRELESS SCHEME c |
| f1 | 40 | 0 | 0 |
| f2 | 40 | 30 | 15 |
| f3 | 20 | 60 | 10 |

| AREA 1 | | | |
|---|---|---|---|
| FREQUENCY | OCCUPANCY LEVEL | | |
| | WIRELESS SCHEME a | WIRELESS SCHEME b | WIRELESS SCHEME c |
| f1 | 40 | 0 | 0 |
| f2 | 40 | 30 | 15 |
| f3 | 20 | 60 | 10 |

FIG.20                                          2000

| AREA 1 | | | |
|---|---|---|---|
| FREQUENCY | OCCUPANCY LEVEL | | |
| | WIRELESS SCHEME a | WIRELESS SCHEME b | WIRELESS SCHEME c |
| f1 | 40 | 0 | 0 |
| f2 | 30 | 0 | 25 |
| f3 | 0 | 15 | 0 |

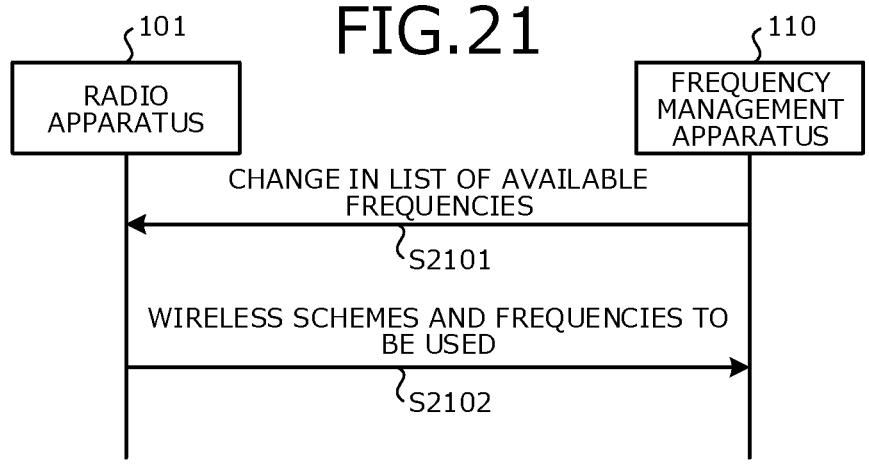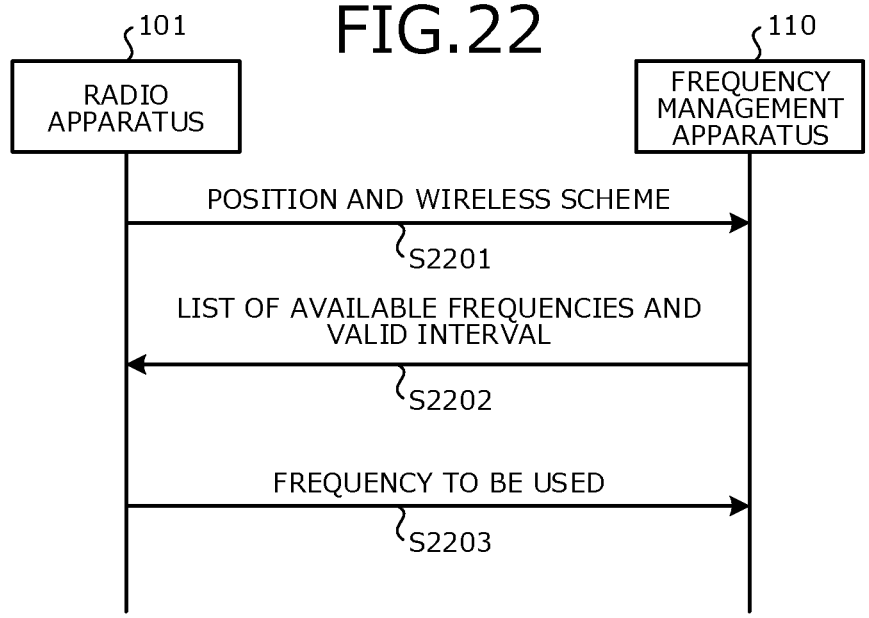

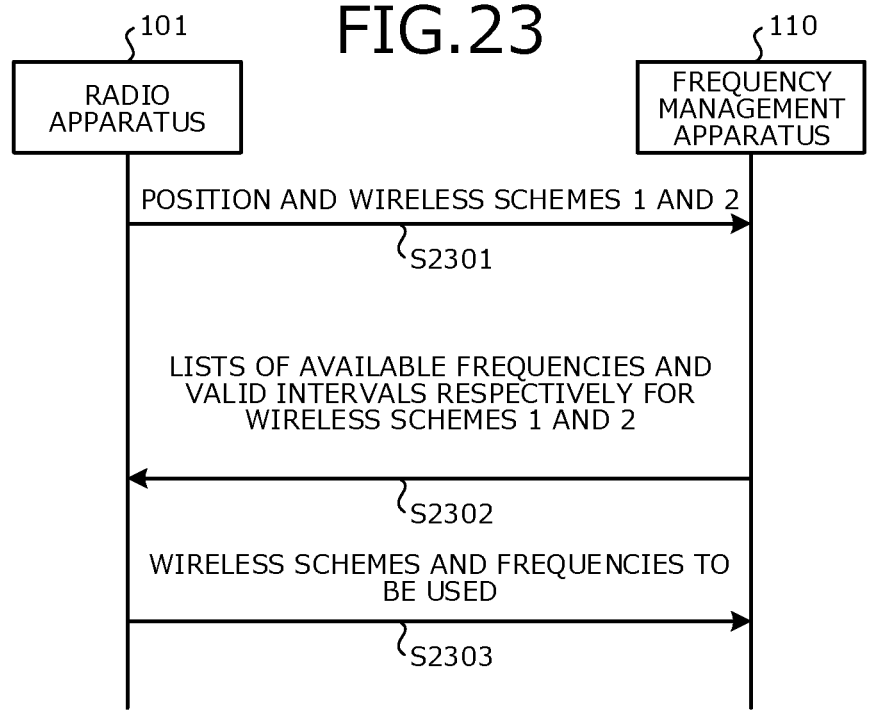

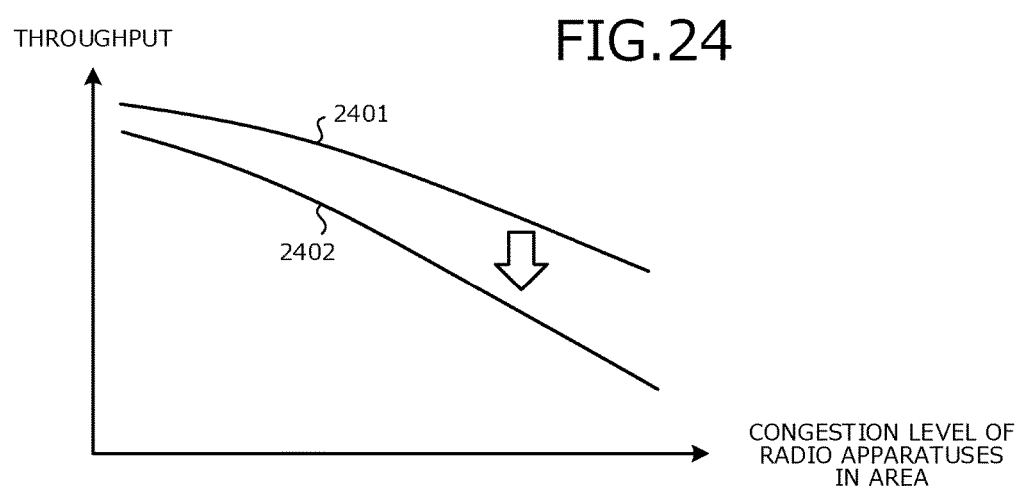

COMMUNICATIONS METHOD, COMMUNICATIONS SYSTEM, CONTROL APPARATUS, AND RADIO APPARATUS

CROSS REFERENCE TO RELATED APPLICATIONS

This application is a continuation application of International Application PCT/JP2013/069227, Jul. 12, 2013 and designating the U.S., the entire contents of which are incorporated herein by reference.

FIELD

The embodiments discussed herein are related to a communications method, a communications system, a control apparatus, and a radio apparatus.

BACKGROUND

Wireless communications traffic is increasing. Accompanying this increase, for example, utilization of available channels (white space) such as television broadcast frequency bandwidths is being investigated (for example, refer to J. Wang, S. Filin, H. Harada, "IEEE802.19-11/0067r0", NICT, July 2011).

Nonetheless, with conventional techniques, when multiple radio apparatuses use the same frequency in the same area, if the communications schemes of the radio apparatuses differ, a problem arises in that interference control is complicated and interference becomes great.

SUMMARY

According to an aspect of an embodiment, a communications method includes transmitting by a radio apparatus, where the radio apparatus transmits to a control apparatus, first information indicating a wireless scheme that the radio apparatus can use in any one among wireless communication and wireless broadcasting; extracting and transmitting by the control apparatus, where the control apparatus extracts from frequency information correlating wireless schemes and available frequencies, a frequency that corresponds to the wireless scheme indicated by the first information transmitted by the radio apparatus and transmits to the radio apparatus, second information indicating the extracted frequency; and performing by the radio apparatus, any one among the wireless communication and the wireless broadcasting, using the frequency indicated by the second information transmitted by the control apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram depicting one example of hardware configuration of a radio apparatus;

FIG. 4 is a diagram depicting an example of hardware configuration of a frequency management apparatus and a communications apparatus;

FIG. 5 is a diagram depicting one example of a detailed functional configuration of the frequency management apparatus;

FIG. 6 is a diagram depicting one example of pixels of each area;

FIG. 7 is a diagram depicting one example of an availability database for the pixels;

FIG. 15 is a diagram depicting one example of the occupancy level table at timing t1;

FIG. 16 is a diagram depicting one example of the occupancy level table at timing t2;

FIG. 17 is a diagram depicting one example of the occupancy level table at timing t3;

FIG. 20 is a diagram depicting one example of the occupancy level table for timing t10;

FIG. 21 is a diagram depicting one example of a sequence when a wireless scheme is changed;

FIG. 22 is a diagram depicting a modification example of the sequence related to a frequency utilization request in the case of one wireless scheme in the frequency management system;

FIG. 23 is a diagram depicting a modification example of the sequence related to a frequency utilization request in the case of two wireless schemes in the frequency management system; and FIG. 24 is a diagram depicting one example of throughput characteristics of wireless scheme x.

DESCRIPTION OF EMBODIMENTS

Embodiments of a communications method, a communications system, a control apparatus, and a radio apparatus will be described in detail with reference to the accompanying drawings. The communications system, for example, is realized by a frequency management system below. Further, the control apparatus, for example, is realized by a frequency management apparatus below.

Figure 1:
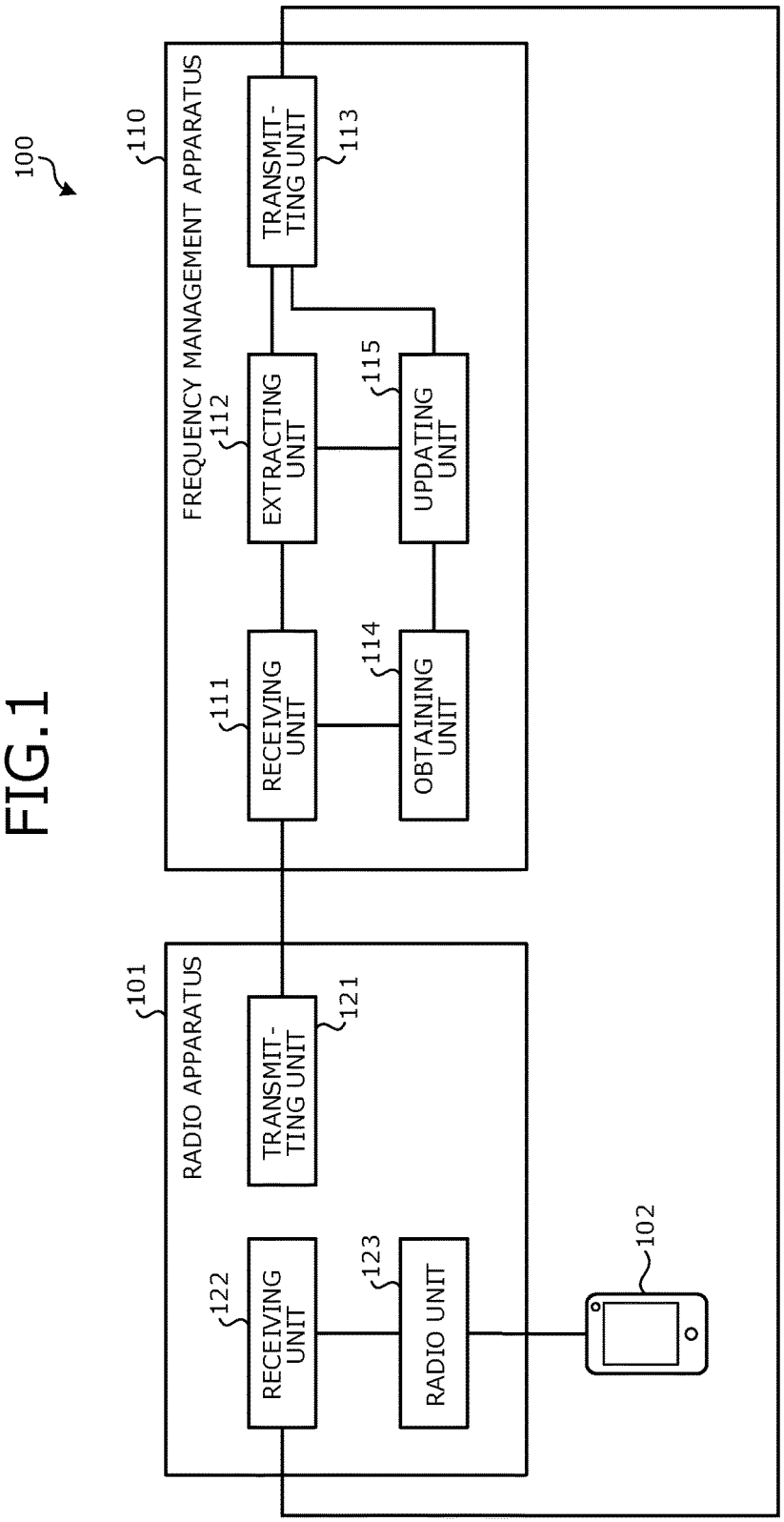
FIG. 1 is a diagram depicting one example of a functional configuration of a frequency management system.

FIG. 1 is a diagram depicting one example of a functional configuration of the frequency management system. As depicted in FIG. 1, a frequency management system 100 has multiple radio apparatuses 101 and a frequency management apparatus 110. The radio apparatuses 101 are each connected to a communications apparatus 102 by a given wireless scheme. The frequency management apparatus 110 is communicably connected to the radio apparatus 101 and manages frequencies for connections between the radio apparatuses 101 and the communications apparatuses 102 by wireless schemes.

Under IEEE802, 3 wireless schemes IEEE802.11af, IEEE802.15.4m, and IEEE802.22 have been standardized for wireless systems that make secondary use of television white space (TVWS). When IEEE802.11af is used, for example, Wireless Fidelity (Wi-Fi) ("Wi-Fi" is a registered tradename) can be used in TVWS. When IEEE802.15.4m is used, for example, short-distance wireless communication standard ZigBee (registered tradename) can be used in TVWS. When IEEE802.22 is used, wide area wireless networks covering moderate to long distance areas can be built.

Under IEEE802.19.1, the coexistence of radio apparatuses 101 that use differing wireless schemes is under investigation. Under IEEE802.19.1, a coexistence manager is provided that manages the coexistence of the radio apparatuses 101, which make secondary use of TVWS, and provides to a wireless system, 2 types of coexistence services, a management service and an information service. The service that is to be used can be determined for each of the radio apparatuses 101 or for each area.

With the management service, the coexistence manager directly assigns a frequency to each of the radio apparatuses 101, thereby realizing coexistence of differing wireless schemes. Meanwhile, with the information service, in response to a request of a given radio apparatus 101, information related to the frequencies used by the radio apparatuses 101 near the given radio apparatus 101 is provided, facilitating selection of a low-interference frequency by the wireless system.

In performing such a management service, coexistence conditions between the radio apparatuses 101 that use differing wireless schemes or the same wireless scheme have to be defined. For example, when differing wireless schemes are used, a condition that communication areas are not negatively affected is set and when the same wireless scheme is used, a condition that the total channel occupancy does not exceed 100% is set. Frequencies are assigned to the radio apparatuses 101 that are at positions where frequencies that satisfy such conditions are present.

Conventionally, information required for frequency assignment and concerning areas or occupancy is based on predictions and consequently, the radio apparatuses 101 each requests a wide frequency bandwidth or a wide area to secure communication quality. Therefore, the frequency bandwidth that can be accepted becomes narrower and the efficiency of frequency utilization drops.

Thus, in the present embodiment, according to a combination of the position and wireless scheme of the radio apparatus 101, available frequencies are set, whereby the occurrence of communications for which complicated interference control for the same frequency and differing wireless schemes can be reduced, reducing interference.

The radio apparatus 101 has a transmitting unit 121, a receiving unit 122, and a radio unit 123. The frequency management apparatus 110 has a receiving unit 111, an extracting unit 112, a transmitting unit 113, an obtaining unit 114, and an updating unit 115. The transmitting unit 121 transmits to the frequency management apparatus 110, information indicating a wireless scheme that can be used by the radio apparatus 101 for wireless communication or wireless broadcasting. The transmitting unit 121 transmits position information of the radio apparatus 101 together with the information indicating the wireless scheme that can be used by the radio apparatus 101 for wireless communication or wireless broadcasting.

The receiving unit 111 receives from the radio apparatus 101, the information indicating the wireless scheme that can be used by the radio apparatus 101 for wireless communication or wireless broadcasting. The extracting unit 112 extracts from frequency information associated with available frequencies and wireless schemes, a frequency that corresponds with the wireless scheme indicated by the information transmitted by the radio apparatus 101. For example, the extracting unit 112 uses the position information of the radio apparatus 101 to extract a frequency in the area in which the radio apparatus 101 is located.

The transmitting unit 113 transmits to the radio apparatus 101, information indicating the frequency extracted by the extracting unit 112. The receiving unit 122 of the radio apparatus 101 receives the information transmitted from the frequency management apparatus 110. The radio unit 123 performs wireless communication or wireless broadcasting with the communications apparatus 102, by the frequency indicated by the information received by the receiving unit 122.

The obtaining unit 114 obtains information that indicates according to frequency, the interference level of radio waves among a radio apparatus group that includes the radio apparatus 101. When the radio wave count becomes large and radio wave congestion becomes high, the interference level, for example, becomes proportionately higher. The updating unit 115, based on the information obtained by the obtaining unit 114, updates the frequency information such that the wireless schemes corresponding to the frequency for which the interference level exceeds a given level are decreased. A case of the interference level exceeding the given level, for example, is a case where radio wave congestion is a given amount or greater.

The extracting unit 112 extracts from among the frequency information updated by the updating unit 115, a frequency that corresponds to the wireless scheme indicated by the information transmitted by the radio apparatus 101. The transmitting unit 113 transmits to the radio apparatus 101, information indicating the frequency extracted by the extracting unit 112.

The updating unit 115, based on the information obtained by the obtaining unit 114 and indicating the interference level, updates the frequency information such that when the interference level of the frequency for which the interference level exceeded the given level falls below the given level, the wireless schemes that were decreased (dropped) above are reinstated. A falling of the interference level below the given level, for example, is a case where the radio wave count becomes low and the radio wave congestion becomes low. The extracting unit 112 extracts from the frequency information updated by the updating unit 115, a frequency that corresponds to the wireless scheme indicated by the information transmitted by the radio apparatus 101. The transmitting unit 113 transmits to the radio apparatus 101, information indicating the frequency extracted by the extracting unit 112.

The updating unit 115 updates the frequency information such that a wireless scheme selected from among wireless schemes corresponding to the frequency for which the interference level exceeds the given level, is set to be unavailable, the wireless scheme being selected based on a count of wireless terminals that are using the wireless scheme among the radio apparatus group. In other words, a frequency for which radio wave congestion has become a given amount or greater, is made unavailable to at least 1 or more wireless schemes that are using the frequency. The wireless scheme for which the frequency is to be made unavailable, for example, is a wireless scheme having a low user count. The radio apparatuses 101 of the wireless scheme for which the frequency has been made unavailable can use the same wireless scheme by changing to another frequency.

When among wireless schemes corresponding to a frequency for which the interference level has exceeded the given level, no wireless scheme is present for which a given proportion exceeds a threshold, the updating unit 115 refrains from reducing the wireless schemes that correspond to the frequency for which the interference level exceeds the given level. The given proportion is the ratio of the apparatus count of the radio apparatus group to the count of wireless terminals using the wireless scheme, called occupancy proportion. Even for a frequency for which the radio wave congestion has become the given amount of greater, if no wireless scheme is present for which the occupancy proportion exceeds the threshold, the wireless schemes are not decreased. As a result, a large number of the radio apparatuses 101 need not change to another frequency.

The updating unit 115 updates the frequency information such that among wireless schemes corresponding to a frequency for which the interference level exceeds the given level, only one wireless scheme can be used. Although the threshold may be a predetermined fixed value, the threshold is a threshold that corresponds to the count of frequencies set to be available only for the wireless scheme, in the frequency information. The threshold corresponding to the count of frequencies set to be available only for the wireless scheme, in the frequency information, for example, is an expected proportion of frequencies for a wireless scheme. The expected proportion will be described in detail hereinafter.

The transmitting unit 113 transmits to the radio apparatus 101, information indicating the frequency extracted by the extracting unit 112 and information indicating an interval during which the extracted frequency can be used. The receiving unit 122 of the radio apparatus 101 receives from the radio apparatus 101, the information indicating the frequency and the information indicating the interval during which the frequency can be used. Until the valid interval indicated by the information received by the receiving unit 122 elapses, the radio unit 123 performs wireless communication or wireless broadcasting by the frequency indicated by the information transmitted by the frequency management apparatus 110.

Figure 2:
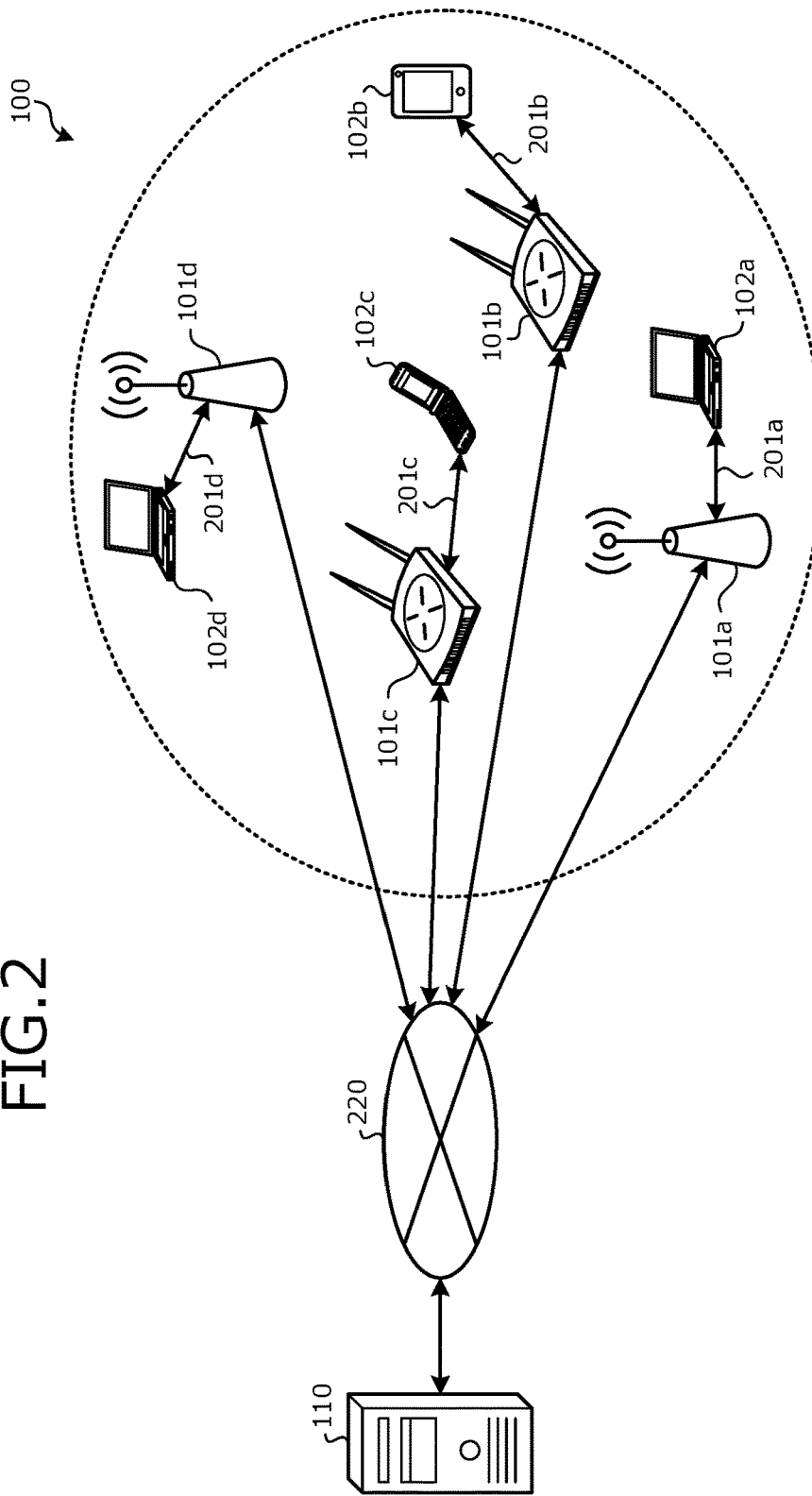
FIG. 2 is a diagram depicting an example of system configuration of the frequency management system.

FIG. 2 is a diagram depicting an example of system configuration of the frequency management system. As depicted in FIG. 2, the frequency management system 100 has the radio apparatuses 101, the communications apparatuses 102, and the frequency management apparatus 110. The radio apparatuses 101 include the radio apparatuses 101a, 101b, 101c, and 101d as depicted in FIG. 2. The communications apparatuses 102 include the communications apparatuses 102a, 102b, 102c, and 102d as depicted in FIG. 2.

The radio apparatuses 101 connect the respective communications apparatuses 102 and a network 220. The communications apparatuses 102, for example, are smartphones, mobile telephones, personal computers (PCs), and the like. The radio apparatuses 101 and the communications apparatuses 102 are respectively connected through a wireless network 201. The wireless network 201, as depicted in FIG. 2, includes wireless networks 201a, 201b, 201c, and 201d. The frequency management apparatus 110 manages the frequencies available in the wireless network 201.

The radio apparatuses 101 connect to the communications apparatuses 102 within a given range as a communication area, enabling communication by the wireless network 201. The radio apparatuses 101 and the communications apparatuses 102 are connected through the wireless network 201, when having a positional relation enabling communication.

As a wireless scheme of the wireless network 201, a wireless local area network (LAN), IEEE802.11a, IEEE802.11n, Wideband Code Division Multiple Access (W-CDMA), Long Term Evolution (LTE) (registered tradename), and the like may be given as an example.

Further, without limitation to the wireless network 201, the network may be a broadcast network. In this case, the radio apparatus 101 is a transmission apparatus and the communications apparatus 102 is a reception apparatus. As a wireless scheme, Integrated Services Digital Broadcasting-Terrestrial (ISDB-T) (registered tradename) and the like may be given as an example.

Each radio apparatus 101 transmits to the frequency management apparatus 110, a frequency utilization request as well as information related to the wireless scheme of the radio apparatus 101 and position information of the radio apparatus 101. The frequency management apparatus 110 manages which frequency is available for which wireless scheme and extracts a frequency that is available for the wireless scheme of the radio apparatus 101. The frequency management apparatus 110 returns the extracted frequency as an available frequency to the radio apparatus 101. The radio apparatus 101 performs communication or broadcasting using the frequency specified by the frequency management apparatus 110.

FIG. 3 is a diagram depicting one example of hardware configuration of the radio apparatus. As depicted in FIG. 3, the radio apparatus 101 has a central processing unit (CPU) 301, memory 302, a user interface 303, a communications interface 304, and a position information obtaining apparatus 305. The CPU 301, the memory 302, the user interface 303, the communications interface 304, and the position information obtaining apparatus 305 are connected by a bus 309.

The CPU 301 governs overall control of the radio apparatus 101. The memory 302, for example, includes main memory and auxiliary memory. The main memory, for example, is random access memory (RAM) and is used as a work area of the CPU 301.

The auxiliary memory, for example, is non-volatile memory such as a magnetic disk, an optical disk, and flash memory. The auxiliary memory stores various programs that operate the radio apparatus 101. Programs stored in the auxiliary memory are loaded onto the main memory and executed by the CPU 301.

The user interface 303, for example, includes an input device that receives operational input from a user and an output device that outputs information to the user. The input device, for example, can be realized by a touch panel or keys (e.g., a keyboard), a remote controller, and the like. The output device, for example, can be realized by a touch panel, a display, a speaker, and the like. The user interface 303 is controlled by the CPU 301.

The communications interface 304, for example, is an interface that performs wireless or wired communication with apparatuses external to the frequency management apparatus 110. The communications interface 304 is controlled by the CPU 301. The position information obtaining apparatus 305 obtains position information of the radio apparatus 101. As the position information obtaining apparatus 305, an apparatus that obtains position information based on global positioning system (GPS) information from a GPS satellite may be given as an example. Nonetheless, the position information obtaining apparatus 305 is not limited to an apparatus that obtains position information based on GPS information and when the radio apparatus 101 is installed at a fixed location, may be an apparatus that obtains the position information from the memory 302 to which the position information for the fixed installation location has been pre-stored.

The transmitting unit 121, the receiving unit 122, and the radio unit 123 of the radio apparatus 101 described with reference to FIG. 1 are realized by the CPU 301. In other words, the CPU 301 executes various programs and thereby, realizes functions of each unit.

FIG. 4 is a diagram depicting an example of hardware configuration of the frequency management apparatus and the communications apparatus. In the description of FIG. 4, although the frequency management apparatus 110 will be described, the configuration is the same for the communications apparatus 102. As depicted in FIG. 4, the frequency management apparatus 110 has a CPU 401, memory 402, a user interface 403, and a communications interface 404. The CPU 401, the memory 402, the user interface 403, and the communications interface 404 are connected by a bus 409.

The CPU 401 governs overall control of the frequency management apparatus 110 or the communications apparatus 102. The memory 402, for example, includes main memory and auxiliary memory. The main memory, for example, is RAM and is used as a work area of the CPU 401.

The auxiliary memory, for example, is non-volatile memory such as a magnetic disk, an optical disk, and flash memory. The auxiliary memory stores various programs that operate the frequency management apparatus 110. Programs stored in the auxiliary memory are loaded onto the main memory and executed by the CPU 401.

The user interface 403, for example, includes an input device that receives operation input from the user and an output device that outputs information to the user. The input device, for example, can be realized by a touch panel or keys (e.g., a keyboard), a remote controller, and the like. The output device, for example, can be realized by a touch panel, a display, a speaker, and the like. The user interface 403 is controlled by the CPU 401.

The communications interface 404, for example, is an interface that performs wireless or wired communication with apparatuses external to the frequency management apparatus 110. The communications interface 404 is controlled by the CPU 401.

The receiving unit 111, the extracting unit 112, the transmitting unit 113, the obtaining unit 114, and the updating unit 115 of the frequency management apparatus 110 described with reference to FIG. 1 are realized by the CPU 401. In other words, the CPU 401 executes various programs and thereby, realizes functions of each unit.

FIG. 5 is a diagram depicting one example of a detailed functional configuration of the frequency management apparatus. In FIG. 5, the frequency management apparatus 110 has a receiving unit 501, a reception signal processing unit 502, a frequency managing unit 503, a transmission signal processing unit 504, a transmitting unit 505, and a storage unit 520.

The receiving unit 501 receives from the radio apparatus 101, a signal carrying wireless scheme related information. The reception signal processing unit 502 decodes the signal received by the receiving unit 501. For example, the reception signal processing unit 502 decodes the signal and thereby, obtains the identification number, position information, and wireless scheme information of the radio apparatus 101.

The frequency managing unit 503 refers to the storage unit 520, which stores frequency utilization according to area, and extracts a list of available frequencies that can be used by the wireless scheme of the radio apparatus 101 in the area in which the radio apparatus 101 is located. The transmission signal processing unit 504 converts the list of frequencies specified by the frequency managing unit 503 and the destination into packets. The transmitting unit 505 transmits to the radio apparatus 101, a signal carrying the packets created by the transmission signal processing unit 504.

The frequency managing unit 503 has a frequency list extracting unit 511, a frequency list determining unit 512, a utilization state counting unit 513, a congestion evaluating unit 514, and a wireless scheme changing unit 515. The frequency list extracting unit 511 refers to a utilization specification table 800 (refer to FIG. 8) stored in the storage unit 520, and extracts a frequency list according to the area in which the radio apparatus 101 is located. The frequency list determining unit 512 determines from among the list of frequencies extracted by the frequency list extracting unit 511, a list of available frequencies. The frequency list determining unit 512 outputs the list of available frequencies to the transmission signal processing unit 504.

The receiving unit 501, consequent to the transmission of the list of available frequencies to the radio apparatus 101, receives from the radio apparatus 101, a signal indicating a frequency to be used. The utilization state counting unit 513 counts the frequencies used by the radio apparatuses 101 and stores the count results to the storage unit 520. For example, the utilization state counting unit 513 updates a utilization state database 900 (refer to FIG. 9) and an occupancy level table 1000 (refer to FIG. 10) stored in the storage unit 520.

The congestion evaluating unit 514 uses the count results of the utilization state updated by the utilization state counting unit 513 and evaluates the congestion level of the frequencies. When a large number of wireless schemes are present and radio waves become congested, radio wave interference is prone to occur. Therefore, the congestion level can be said to be the interference level. The congestion evaluating unit 514, more specifically, evaluates whether the congestion level is one for which signal degradation consequent to interference is a given value or greater.

The wireless scheme changing unit 515 controls authorization of the wireless schemes that can be used in an area. For example, when the congestion evaluating unit 514 evaluates the congestion level to be one for which the signal degradation consequent to interference is the given value or greater, the wireless scheme changing unit 515 restricts the wireless schemes that can be used. In other words, when the congestion level is high, the wireless scheme changing unit 515 restricts the available wireless schemes.

After restricting the available wireless schemes, the wireless scheme changing unit 515 releases the wireless scheme restriction, when the congestion evaluating unit 514 evaluates the congestion level to be one for which there is substantially no signal degradation consequent to interference. In other words, when the congestion level becomes low, the wireless scheme changing unit 515 releases the restriction on available wireless schemes.

The receiving unit 501, the reception signal processing unit 502, the frequency managing unit 503, the transmission signal processing unit 504, the transmitting unit 505, the frequency list extracting unit 511, the frequency list determining unit 512, the utilization state counting unit 513, the congestion evaluating unit 514, and the wireless scheme changing unit 515 are realized by the CPU 401 depicted in FIG. 4. In other words, the CPU 401 executes various programs and thereby, realizes functions of the units (501 to 505, 511 to 515). Further, the storage unit 520 is realized by the memory 402 depicted in FIG. 4.

FIG. 6 is a diagram depicting one example of pixels of each area. As indicated by reference numeral 600 in FIG. 6, the frequency management apparatus 110, for example, manages frequency in units of pixels that divide sections of each area into a grid. More specifically, the frequency management apparatus 110 numbers each pixel such as pixel 1, pixel 2, . . . , and manages frequencies for each area, which includes multiple pixels.

FIG. 7 is a diagram depicting one example of an availability database for the pixels. As depicted in FIG. 7, an availability database 700, for example, associates an available frequency bandwidth with each pixel in each area. The frequency bandwidths are defined by an upper limit frequency and a lower limit frequency. For each pixel of the availability database 700, "0" indicates an available frequency and "1" indicates an unavailable frequency. For example, for pixel 1, frequency bandwidth f1 is available, and frequency bandwidth f2 is unavailable. In this manner, for each pixel in each area, indication of which frequencies are available is stored.

When the maximum transmission power differs according to pixel, the maximum transmission power is stored in each database. In this case, for example, 0 W is stored for frequencies that are not available. Further, when the maximum transmission power differs for a stationary device (stationary master radio apparatus) and a portable device (portable master radio apparatus), the availability database 700 is prepared for each device type. The availability database 700 is stored in the storage unit 520 (refer to FIG. 5) of the frequency management apparatus 110.

Figure 8:
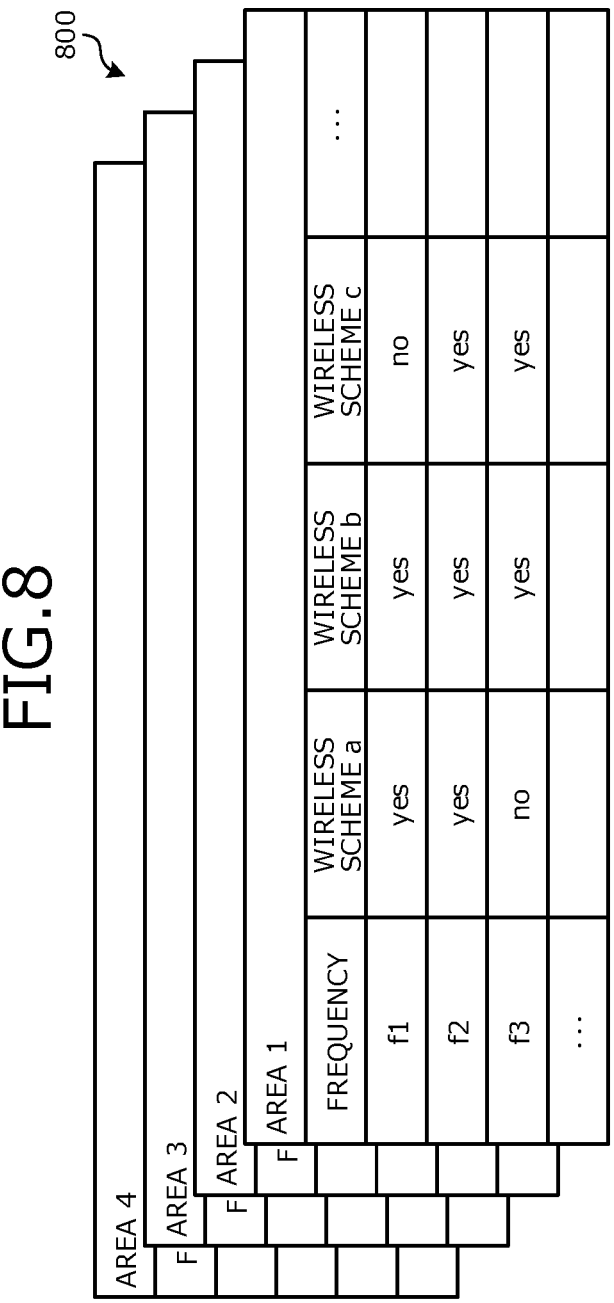
FIG. 8 is a diagram depicting one example of a utilization specification table.

FIG. 8 is a diagram depicting one example of the utilization specification table. As depicted in FIG. 8, the utilization specification table 800 indicates available frequencies for wireless schemes of each area. For example, in area 1, it is indicated that frequency f1 can be used by wireless scheme a and wireless scheme b. Further, it is indicated that frequency f2 can be used by wireless scheme a, wireless scheme b, and wireless scheme c. It is further indicated that frequency f3 can be used by wireless scheme b and wireless scheme c.

In other words, in the case of wireless scheme a, frequencies f1 and f2 are available for use. In the case of wireless scheme b, frequencies f1, f2, and f3 are available for use; and in the case of wireless scheme c, frequencies f2 and f3 are available for use. In this manner, in the utilization specification table 800, available frequencies of each wireless scheme in each area are indicated. The utilization specification table 800 is stored in the storage unit 520 (refer to FIG. 5) of the frequency management apparatus 110.

Figure 9:
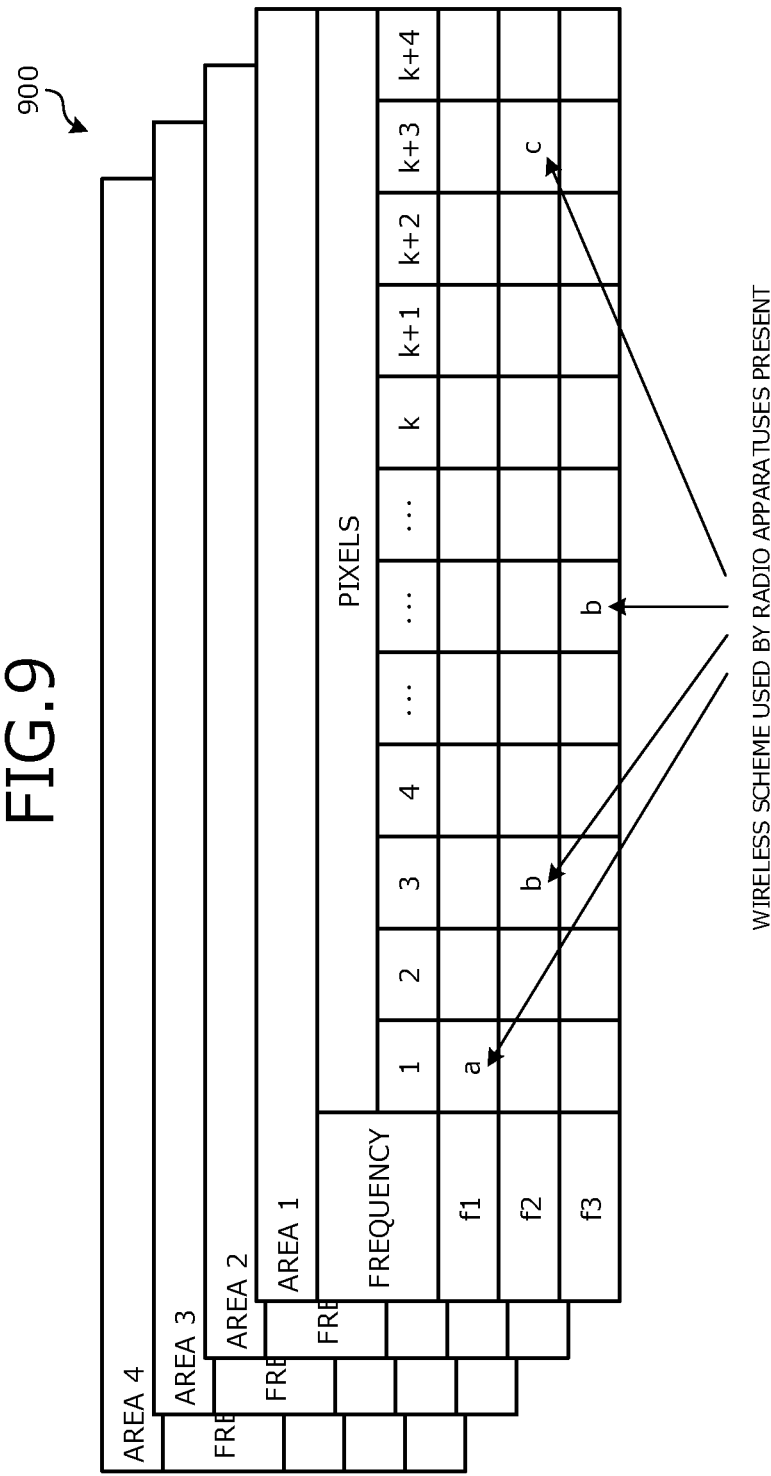
FIG. 9 is a diagram depicting one example of a utilization state database.

FIG. 9 is a diagram depicting one example of the utilization state database. As depicted in FIG. 9, the utilization state database 900 stores for each pixel of each area, in-use wireless schemes according to frequency. For example, the utilization state database 900 indicates that in pixel 1 of area 1, wireless scheme a of frequency f1 is in-use. The utilization state database 900 further indicates that in pixel 3 of area 1, wireless scheme b of frequency f2 is in-use and in pixel k+3 of area 1, wireless scheme c of frequency f2 is in-use.

Figures 10, 11:
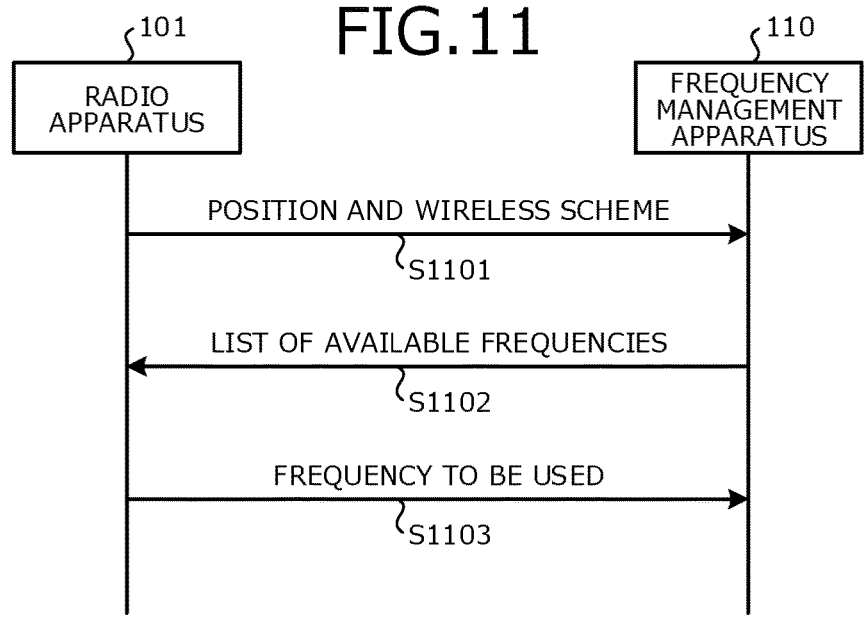
FIG. 10 is a diagram depicting one example of an occupancy level table.
FIG. 11 is a diagram depicting one example of a sequence related to a frequency utilization request in a case of one wireless scheme in the frequency management system.

FIG. 10 is a diagram depicting one example of the occupancy level table. As depicted in FIG. 10, the occupancy level table 1000 stores occupancy levels according to wireless scheme for each frequency of each area. At frequency fn, the occupancy level of wireless scheme x can be calculated by equation (1).

$$P_n(x)=\Sigma_{j=1}^{J} p_n(x,j) \quad (1)$$

Where, pn(x,j)=1 when radio apparatus j uses wireless scheme x and "0" in other cases. In other words, by counting up the radio apparatuses that are using wireless scheme x in a given area, the occupancy level can be calculated.

For example, as indicated by the occupancy level table 1000, for frequency f1, wireless scheme a is P1(a), wireless scheme b is P1(b), and wireless scheme c is P1(c). Although description has been given using an example where the occupancy level table 1000 has 3 frequencies and 3 wireless schemes, this is but one example, and numerous frequencies and wireless schemes may be included.

FIG. 11 is a diagram depicting one example of a sequence related to a frequency utilization request in the case of one wireless scheme in the frequency management system. As depicted in FIG. 11, the radio apparatus 101 transmits to the frequency management apparatus 110, information related to position and wireless scheme (step S1101). Upon receiving the information related to position and wireless scheme from the radio apparatus 101, the frequency management apparatus 110 transmits to the radio apparatus 101, information indicating a list of available frequencies (step S1102). The radio apparatus 101 selects a frequency to be used from the list of available frequencies and transmits to the frequency management apparatus 110, information indicating the frequency to be used (step S1103).

Thus, in the frequency management system 100, the frequency to be used in the wireless network 201, between the radio apparatus 101 and the communications apparatus 102 is determined. Furthermore, upon receiving the information indicating the frequency to be used from the radio apparatus 101, the frequency management apparatus 110 updates the utilization state database 900 (refer to FIG. 9) and the occupancy level table 1000 (refer to FIG. 10).

Figure 12:
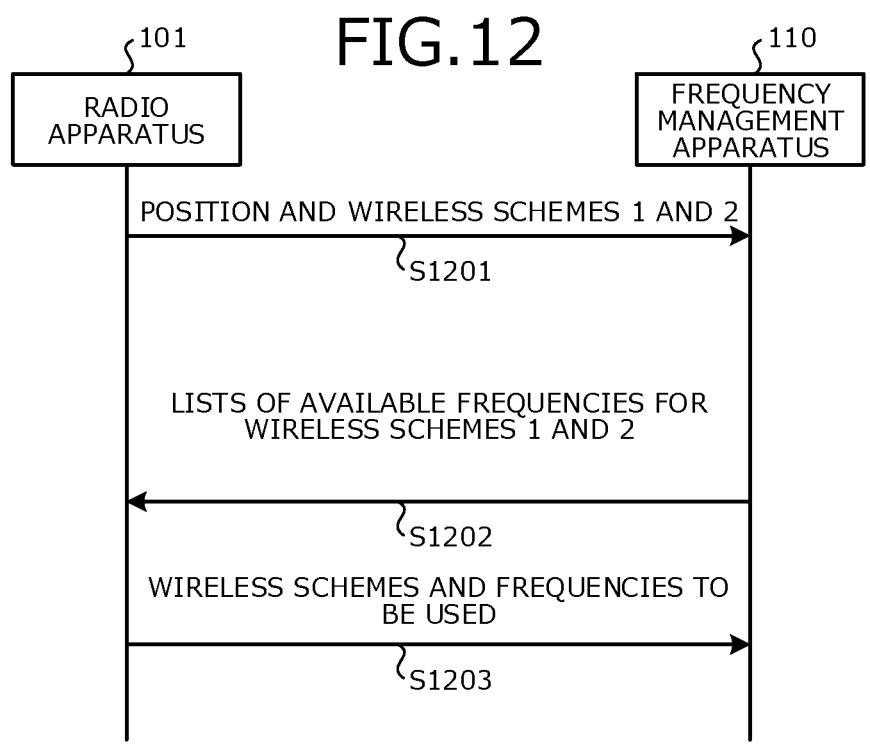
FIG. 12 is a diagram depicting one example of a sequence related to a frequency utilization request in a case of two wireless schemes in the frequency management system.

FIG. 12 is a diagram depicting one example of a sequence related to a frequency utilization request in the case of two wireless schemes in the frequency management system. As depicted in FIG. 12, the radio apparatus 101 transmits to the frequency management apparatus 110, information related to position and wireless schemes 1 and 2 (step S1201). Upon receiving the information related to position and wireless schemes 1 and 2 from the radio apparatus 101, the frequency management apparatus 110 transmits to the radio apparatus 101, information indicating respective lists of available frequencies for wireless schemes 1 and 2 (step S1202).

From the respective lists of available frequencies for wireless schemes 1 and 2, the radio apparatus 101 selects for wireless schemes 1 and 2, respectively, a frequency that is to be used and transmits to the frequency management apparatus 110, information indicating the wireless schemes and frequencies to be used (step S1203). Thus, wireless schemes and frequencies to be used in the wireless network 201, between the radio apparatus 101 and the communications apparatus 102 in the frequency management system 100 are determined. In FIG. 11, although a case has been described where there are two wireless schemes in the frequency management system, when the number of wireless schemes in the frequency management system is "n", frequencies are determined for each of the n wireless schemes.

Figure 13:
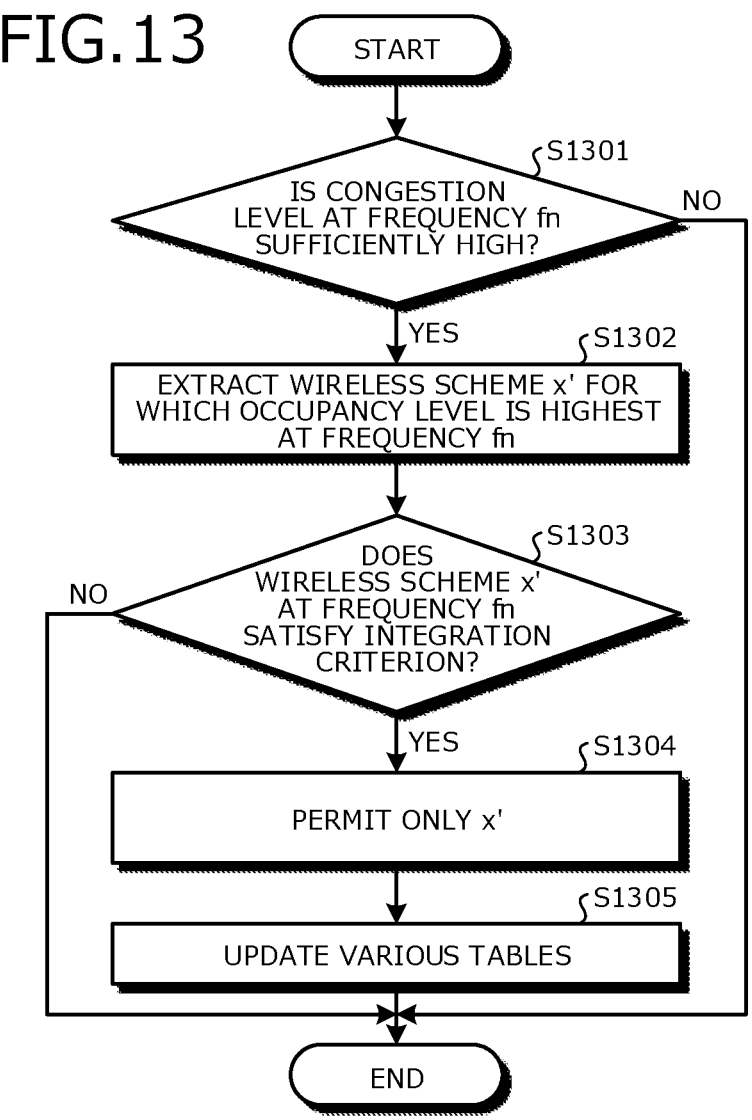
FIG. 13 is a flowchart of one example of a process of integrating a wireless scheme performed by the frequency management apparatus.

FIG. 13 is a flowchart of one example of a process of integrating a wireless scheme performed by the frequency management apparatus. As depicted in FIG. 13, the frequency management apparatus 110 determines whether the congestion level at frequency fn is sufficiently high (step S1301). The timing at which the determination at step S1301 is performed, for example, is at the time when a radio apparatus 101 is newly registered, at a given interval, and the like.

The congestion level at frequency fn being sufficiently high is a case where the total occupancy level of all the wireless schemes is a predetermined threshold or greater, i.e., a large number of wireless schemes are present and radio waves have become congested. As a method to determine the congestion level more precisely, communication areas, transmission powers, temporal rates of frequency utilization, etc. of the radio apparatuses 101 may be used. For example, in the sequence depicted in FIG. 10, configuration may be such that the radio apparatus 101 transmits information concerning these parameters together with the actual frequency used and the frequency management apparatus 110 uses this information to determine the congestion level.

For example, when the radio apparatus 101 transmits information concerning the communication area together with the actual frequency used, the frequency management apparatus 110 sets pn(x,j)=the area of the communication area when radio apparatus j uses wireless scheme x and sets pn(x,j)=0 in other cases. The congestion level may be determined using this area, the total occupancy level of all the wireless schemes, and the predetermined threshold.

If the congestion level is not sufficiently high (step S1301: NO), the frequency management apparatus 110 ends the series of operations according to the flowchart. If the congestion level is sufficiently high (step S1301: YES), the frequency management apparatus 110 extracts wireless scheme x' for which the occupancy level is highest at frequency fn (step S1302).

The frequency management apparatus 110 determines whether wireless scheme x' for which the occupancy level is highest at frequency fn satisfies an integration criterion (step S1303). The integration criterion will be described hereinafter with reference to FIG. 14. If wireless scheme x' does not satisfy the integration criterion (step S1303: NO), the frequency management apparatus 110 ends the series of operations according to the flowchart. If wireless scheme x' satisfies the integration criterion (step S1303: YES), the frequency management apparatus 110 permits only x' as a wireless scheme to use frequency fn in the given area (step S1304). The frequency management apparatus 110 updates various tables such as the utilization specification table 800 (refer to FIG. 8), the utilization state database 900 (refer to FIG. 9), and the occupancy level table 1000 (refer to FIG. 10) (step S1305), and ends the series of operations according to the flowchart.

The integration criterion for wireless schemes that are to be permitted at the respective frequencies can be arbitrarily set by a manager of the frequency management apparatus 110. Here, wireless scheme integration can improve overall frequency utilization efficiency and serve as one index to reduce as much as possible, constraints on frequency utilization of the respective radio apparatuses 101. The integration criterion will be described hereinafter with reference to FIG. 14.

Figure 14:
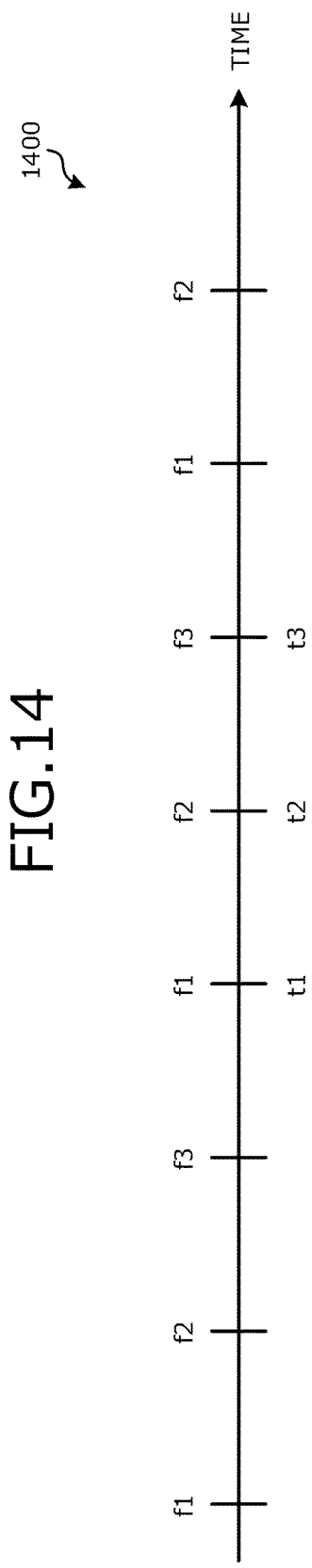
FIG. 14 is a diagram (part 1) depicting one example of a timing chart when a congestion level is periodically determined for frequencies f1, f2, and f3.

FIG. 14 is a diagram (part 1) depicting one example of a timing chart when the congestion level is periodically determined for frequencies f1, f2, and f3. In FIG. 14, timing chart 1400 depicts timing t1 when the congestion level is determined concerning frequency f1, timing t2 when the congestion level is determined concerning frequency f2, and timing t3 when the congestion level is determined concerning frequency f3. In this manner, the congestion level is determined periodically concerning each frequency f1, f2, and f3.

FIG. 15 is a diagram depicting one example of the occupancy level table at timing t1. Wireless scheme a for which the occupancy level is highest for frequency f1 is an integration candidate. Here, occupancy proportion Y is calculated using equation (2).

$$\frac{\sum_n P_n(x)}{\sum_n \sum_x P_n(x)} \tag{2}$$

By substituting values of an occupancy level table 1500 depicted in FIG. 15 into equation (2), occupancy proportion Y=(40+40+20)/(40+40+20+30+15+45+5+10+10)=100/215 is calculated.

Further, an expected proportion Z of frequency dedicated to wireless scheme a can be expressed as expected proportion Z=[(sum of frequency bandwidths already limited to wireless scheme a+frequency bandwidth currently determined)/total number of types of bandwidth]=(0+1)/(1+1+1)=⅓.

In the present embodiment, "occupancy proportion Y≥expected proportion Z" is regarded as the integration criterion. In the case of the values in the occupancy level table 1500, the integration criterion is satisfied. Therefore, at timing t1, frequency f1 is integrated with wireless scheme a for which the occupancy level is highest. Further, frequency f1 cannot be used for wireless schemes b and c. In this manner, when radio waves are congested and utilization has been limited to only wireless scheme a, the frequency management apparatus 110 notifies the radio apparatuses 101 of such.

FIG. 16 is a diagram depicting one example of the occupancy level table at timing t2. An occupancy level table 1600 depicted in FIG. 16 integrates frequency f1 with wireless scheme a since at timing t1, frequency f1 satisfies the integration criterion. Frequency f1 is integrated with wireless scheme a and the occupancy level 30 of wireless scheme b at frequency f1 in FIG. 15 is moved to frequencies f2 and f3 for wireless scheme b in units of 15 each as depicted in FIG. 16. Further, the occupancy level 5 of wireless scheme c at frequency f1 in FIG. 15 is moved to frequency f2 for wireless scheme c depicted in FIG. 16. In other words, consequent to frequency f1 being integrated with wireless scheme a, the radio apparatuses 101 using wireless scheme b and wireless scheme c at frequency f1 are switched to another frequency.

In the occupancy level table 1600, wireless scheme a for which the occupancy level is highest for frequency f2 is an integration candidate. In this case, by using the values in the occupancy level table 1600 and equation (2) to calculate occupancy proportion Y, occupancy proportion Y=(40+40+20)/(40+40+20+30+60+15+10)=100/215.

Expected proportion Z is [(sum of frequency bandwidths already limited to wireless scheme a+frequency bandwidth currently determined)/total number of types of bandwidth]=(1+1)/(1+1+1)=2/3. In other words, for frequency f2 at timing t2, "occupancy proportion Y<expected proportion Z" is true and the integration criterion "occupancy proportion Y≥expected proportion Z" is not satisfied. Therefore, at timing t2, integration of frequency f2 to wireless scheme a is not performed.

FIG. 17 is a diagram depicting one example of the occupancy level table at timing t3. An occupancy level table 1700 depicted in FIG. 17 integrates frequency f1 with wireless scheme a since at timing t1, frequency f1 satisfies the integration criterion. Further, at timing t2, since frequency f2 does not satisfy the integration criterion, frequency f2 is not integrated with a wireless scheme. Therefore, the occupancy level table 1700 indicates the same values as the occupancy level table 1600 (refer to FIG. 16).

In the occupancy level table 1700, wireless scheme b for which the occupancy level is highest for frequency f3 is an integration candidate. In this case, by using the value in the occupancy level table 1700 and equation (2) to calculate occupancy proportion Y, occupancy proportion Y=(0+30+60)/(40+40+20+30+60+15+10)=90/215.

Expected proportion Z is [(sum of frequency bandwidths already limited to wireless scheme b+frequency bandwidth currently determined)/total number of types of bandwidth]=(0+1)/(1+1+1)=1/3. In other words, for frequency f3 at timing t3, "occupancy proportion Y≥expected proportion Z" is true and the integration criterion is satisfied. Therefore, frequency f3 is integrated with wireless scheme b for which the occupancy level is highest. Further, frequency f3 cannot be used for wireless schemes a and c. In this manner, when radio waves are congested and utilization has been limited to only wireless scheme b, the frequency management apparatus 110 notifies the radio apparatuses 101 of such.

Figure 18:
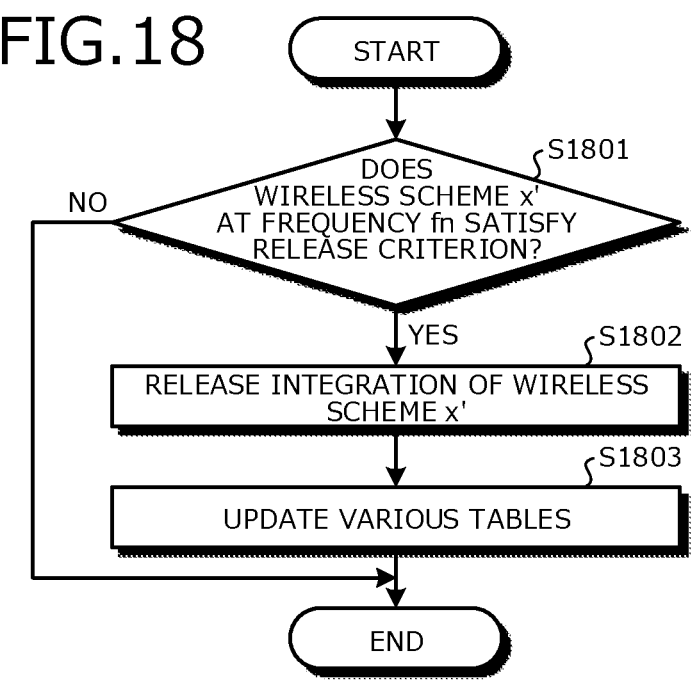
FIG. 18 is a flowchart of one example of a process of releasing wireless scheme integration performed by the frequency management apparatus.

FIG. 18 is a flowchart of one example of a process of releasing wireless scheme integration performed by the frequency management apparatus. As depicted in FIG. 18, the frequency management apparatus 110 determines whether at frequency fn, wireless scheme x' for which the occupancy level is highest satisfies a release criterion (step S1801). The determination at step S1801 is performed when a radio apparatus 101 is newly registered, at a given interval, and the like. The release criterion will be described hereinafter with reference to FIG. 19.

If wireless scheme x' does not satisfy the release criterion (step S1801: NO), the frequency management apparatus 110 ends the series of operations according to the flowchart. If wireless scheme x' satisfies the release criterion (step S1801: YES), the frequency management apparatus 110 releases the integration of wireless scheme x' for the use of frequency fn in the area (step S1802). Subsequently, the frequency management apparatus 110 updates various tables such as the utilization specification table 800 (refer to FIG. 8), etc. (step S1803), and ends the series of operations according to the flowchart.

The release criterion for releasing wireless scheme integration at the respective frequencies can be set by the manager of the frequency management apparatus 110. Here, the release criterion for wireless scheme integration can improve overall frequency utilization efficiency and serve as one index to reduce as much as possible, constraints on frequency utilization of the respective radio apparatuses 101. The release criterion for wireless scheme integration will be described hereinafter with reference to FIG. 19.

Figure 19:
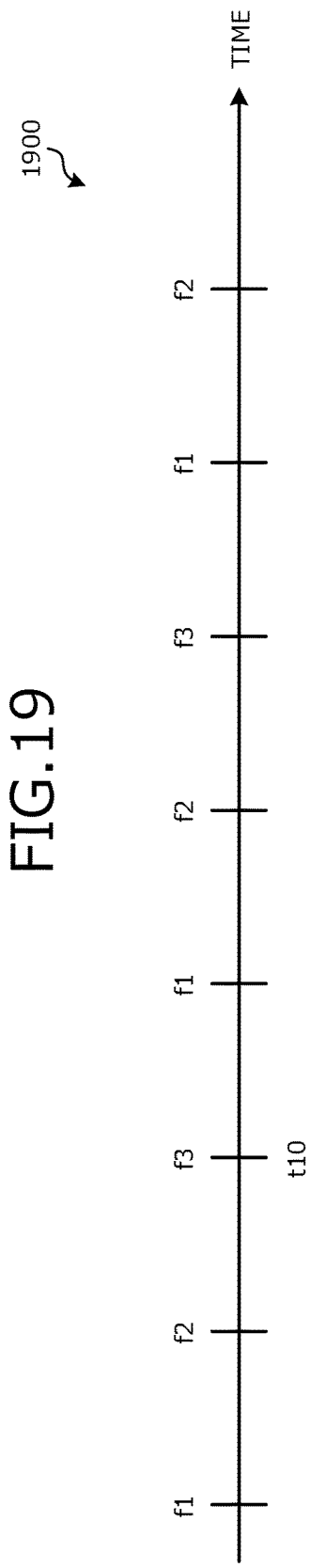
FIG. 19 is a diagram (part 2) depicting one example of a timing chart when the congestion level is periodically determined for frequencies f1, f2, and f3.

FIG. 19 is a diagram (part 2) depicting one example of a timing chart when the congestion level is periodically determined for frequencies f1, f2, and f3. In FIG. 19, a timing chart 1900 depicts the timing at which wireless scheme authorization management is performed periodically for each frequency in sequence. For example, at timing t10, the frequency management apparatus 110 determines the congestion level at frequency f3.

FIG. 20 is a diagram depicting one example of the occupancy level table for timing t10. As indicated by an occupancy level table 2000 in FIG. 20, at timing t10, frequency f1 is assumed to be integrated with wireless scheme a, and frequency f3 is assumed to be integrated with wireless scheme b. Here, the release of wireless scheme b of frequency f3 will be described. First, occupancy proportion Y is calculated using equation (2).

Substitution of values in the occupancy level table 2000 into equation (2) yields occupancy proportion Y=(15)/(40+30+15+25)=15/110.

Further, a dedicated frequency proportion W (corresponds to expected proportion Z) for wireless scheme b can be expressed as dedicated frequency proportion W=(sum of frequency bandwidths limited to wireless scheme b/total number of types of bandwidth)=(1)/(1+1+1)=1/3.

In the present embodiment, "occupancy proportion Y<0.5×dedicated frequency proportion W" is regarded as the release criterion. In the case of the values for timing t10 in the occupancy level table 2000, the release criterion is assumed to be satisfied. Therefore, at timing t10, frequency f3 is released from integration with wireless scheme b. In this manner, when use is limited to wireless scheme b and radio waves become available, the integration of frequency f3 with wireless scheme b is released to enable use by wireless schemes a and c as well. The frequency management apparatus 110 gives notification of such to the radio apparatus 101.

FIG. 21 is a diagram depicting one example of a sequence when the wireless scheme is changed. As depicted in FIG. 21, when wireless schemes have changed consequent to the integration criterion being satisfied or the integration of a wireless scheme being released, the frequency management apparatus 110 transmits to the radio apparatus 101, information indicating changes in the list of available frequencies (step S2101). The radio apparatus 101 selects a frequency to use from the list of available frequencies and transmits to the frequency management apparatus 110, information indicating the wireless scheme and the frequency to be used (step S2102).

With such a configuration, in the frequency management system 100, the frequency used between the radio apparatus 101 and the communications apparatus 102 in the wireless network 201 changes. The frequency management apparatus 110, upon receiving the information indicating the frequency to be used from the radio apparatus 101, updates the utilization specification table 800 (refer to FIG. 8), the utilization state database 900 (refer to FIG. 9), and the occupancy level table 1000 (refer to FIG. 10) stored in the storage unit 520.

FIG. 22 is a diagram depicting a modification example of the sequence related to a frequency utilization request in the case of one wireless scheme in the frequency management system. The modification example depicted in FIG. 22 differs from the sequence related to the frequency utilization request depicted in FIG. 11 in that the frequency management apparatus 110 transmits to the radio apparatus 101, information indicating the list of available frequencies and a valid interval.

As depicted in FIG. 22, the radio apparatus 101 transmits to the frequency management apparatus 110, information related to position and wireless scheme (step S2201). The frequency management apparatus 110, upon receiving the information related to position and wireless scheme from the radio apparatus 101, transmits to the radio apparatus 101 information indicating the list of available frequencies and a valid interval (step S2202). The radio apparatus 101 selects a frequency to be used from among the list of available frequencies and transmits to the frequency management apparatus 110, information indicating the frequency to be used (step S2203).

With such a configuration, in the frequency management system 100, the frequency is determined that is to be used in the wireless network 201 between the radio apparatus 101 and the communications apparatus 102 until the elapse of the valid interval. The frequency management apparatus 110, upon receiving the information indicating the frequency to be used from the radio apparatus 101, updates the utilization state database 900 (refer to FIG. 9) and the occupancy level table 1000 (refer to FIG. 10) stored in the storage unit 520. Further, when the valid interval elapses, for example, connection with the radio apparatus 101 is released and the sequence of operations depicted in FIG. 22 is again performed whereby, reconnection is enabled.

FIG. 23 is a diagram depicting a modification example of the sequence related to a frequency utilization request in the case of two wireless schemes in the frequency management system. The modification example depicted in FIG. 23 differs from the frequency utilization request depicted in FIG. 12 in that the frequency management apparatus 110 transmits to the radio apparatus 101, information related to lists of available frequencies and valid intervals respectively for the wireless schemes 1 and 2.

As depicted in FIG. 23, the radio apparatus 101 transmits to the frequency management apparatus 110, information related to position and the wireless schemes 1 and 2 (step S2301). The frequency management apparatus 110, upon receiving the information related to position and the wireless schemes 1 and 2 from the radio apparatus 101, transmits to the radio apparatus 101, information indicating the lists of available frequencies and valid intervals respectively for the wireless schemes 1 and 2 (step S2302).

The radio apparatus 101 selects from among the lists of available frequencies respectively for the wireless schemes 1 and 2, a frequency to be used for each of the wireless schemes 1 and 2, and transmits to the frequency management apparatus 110, information indicating the frequencies to be used and the wireless schemes (step S2303). With such a configuration, in the frequency management system 100, the wireless scheme and the frequency to be used in the wireless network 201 between the radio apparatus 101 and the communications apparatus 102 until the elapse of the valid interval are determined. In FIG. 11, although a case where there are two wireless schemes in the frequency management system is described, when the number of wireless schemes in the frequency management system is n, a frequency is determined for each of the n wireless schemes.

The frequency management apparatus 110, upon receiving the information indicating the frequency to be used from the radio apparatus 101, updates the utilization state database 900 (refer to FIG. 9) and the occupancy level table 1000 (refer to FIG. 10) stored in the storage unit 520. Further, when the valid interval elapses, for example, the connection is released and the sequence of operations depicted in FIG. 23 is again performed whereby, reconnection is enabled.

By setting the valid interval in this manner, the radio apparatus 101 allowed use can be controlled for each valid interval and use for a long period by a particular radio apparatus 101 can be suppressed. As a result, radio wave congestion can be suppressed. Further, in cases where such a valid interval is set, when radio waves become congested, one wireless scheme can be integrated with each frequency.

When the valid interval is set, the timing at which authorization management of the wireless schemes is performed is not limited to a given interval (refer to FIGS. 14 and 19). Use of the valid intervals set for the radio apparatuses 101 enables congested states to be predicted and since satisfaction of the release criterion for releasing integration of a wireless scheme can be predicted, the timing at which authorization management of the wireless schemes is performed may be the timing when satisfaction of the release criterion has been predicted.

FIG. 24 is a diagram depicting one example of throughput characteristics of wireless scheme x. FIG. 24 depicts a case where degradation of throughput is used to determine the congestion level. In a graph in FIG. 24, the horizontal axis represents the congestion level of radio apparatuses in an area and the vertical axis represents throughput (communication speed). The frequency management apparatus 110 pre-stores for each wireless scheme, a characterizing curve 2401 in the case of no mixed presence of wireless schemes, obtained by simulation. Characterizing curve 2401 represents throughput characteristics when only radio apparatuses 101 of wireless scheme x are present.

The radio apparatuses 101 respectively report (transmit) throughput characteristics periodically to the frequency management apparatus 110. The frequency management apparatus 110 calculates based on the report results of the radio apparatuses 101, degradation of wireless scheme throughput for each radio apparatus 101. Degradation of throughput is the difference from the characterizing curve 2401. If multiple wireless schemes are present, by calculating degradation of throughput, for example, characterizing curve 2402 is derived. Characterizing curve 2402 indicates throughput characteristics in a case when the radio apparatuses 101 of wireless scheme x are only p %.

By using such throughput characteristics, when the sum of throughput degradation (difference from characterizing curve 2401) becomes a threshold or greater, it may be determined that the congestion level is high. In this manner, the congestion level can be determined using throughput degradation.

Further, for example, the radio apparatus 101 may directly measure the interference power of another radio apparatus 101 and report (transmit) to the frequency management apparatus 110, the interference power for each wireless scheme. In this case, the frequency management apparatus 110 sums the values reported by the radio apparatus 101 and when the interference power between differing wireless schemes becomes a threshold or greater, determines that the congestion level is high.

As described, in the present embodiment, by setting available frequencies according to combinations of the position and wireless scheme of the radio apparatuses 101, the occurrence of communication for which interference control for the same frequency with differing wireless schemes is complicated can be reduced, enabling interference to be reduced. Further, for example, since performing a test in advance to identify frequencies and confirm whether secondary use is possible is not necessary, no man-hours need be consumed for maintaining frequency management.

Further, in the present embodiment, since a frequency that can be used by the wireless scheme of the radio apparatus 101 is extracted based on wireless scheme related information received from the radio apparatus 101, radio wave interference between radio apparatuses 101 of differing wireless schemes can be suppressed.

In the present embodiment, since wireless schemes corresponding to a frequency for which the interference level of radio waves of the frequency exceeds a given level are decreased, radio wave interference among multiple frequencies can be reduced.

In the present embodiment, when the interference level drops below a given level, wireless schemes that were dropped and correspond to the frequency for which the interference level exceeded the given level are reinstated. Therefore, when congestion is mitigated and interference decreases, wireless scheme constraints are removed, enabling available wireless schemes to freely utilize the frequency.

Further, in the present embodiment, a wireless scheme selected from among wireless schemes corresponding to a frequency for which the interference level exceeds the given level and selected based on the number of wireless terminals that are using the wireless scheme is prevented from being used at the frequency. Accordingly, a wireless scheme having few users can be prevented from being used. The radio apparatuses 101 of the wireless scheme that has become unavailable changes to another frequency whereby, for example, since the same wireless scheme can be used, the number of the radio apparatuses 101 that change to another frequency can be suppressed, enabling the load when changing to be alleviated.

In the present embodiment, if no wireless scheme for which the occupancy ratio exceeds the threshold is present among wireless schemes corresponding to a frequency for which the interference level exceeds the given level, the wireless schemes are not decreased. As a result, when a large number of radio apparatuses 101 that would have to change frequency are present, configuration can be such that the changing of frequency need not be performed. Accordingly, the radio apparatus 101 can be saved of the load for changing to another frequency.

Further, in the present embodiment, when the integration criterion "occupancy proportion Y≥expected proportion Z" is satisfied, the wireless scheme is integrated and therefore, biased setting of the same wireless scheme to a single frequency can be suppressed. Consequently, differing wireless schemes can be set to each frequency and radio wave interference can be reduced.

In the present embodiment, use by a wireless scheme of a radio apparatus 101 until the valid interval during which the frequency can be used elapses is permitted. As a result, the radio apparatus 101 capable of use can be limited for each valid interval and use for a long period by a particular radio apparatus 101 can be prevented. Accordingly, radio wave interference can be reduced.

According to one aspect of the present embodiment, an effect is achieved in that interference can be reduced.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communications method comprising:
transmitting by a radio apparatus, the radio apparatus transmitting to a control apparatus, first information indicating a wireless scheme that the radio apparatus can use in any one among wireless communication and wireless broadcasting;
extracting and transmitting by the control apparatus, the control apparatus extracting from frequency information correlating wireless schemes and available frequencies, a frequency that corresponds to the wireless scheme indicated by the first information transmitted by the radio apparatus and the control apparatus transmitting to the radio apparatus, second information indicating the extracted frequency; and
performing by the radio apparatus, any one among the wireless communication and the wireless broadcasting, using the frequency indicated by the second information transmitted by the control apparatus, wherein
the transmitting by the control apparatus includes the control apparatus transmitting to the radio apparatus, the second information indicating the extracted frequency and third information indicating an interval during which the extracted frequency is available, and
the performing by the radio apparatus, any one among the wireless communication and the wireless broadcasting includes the radio apparatus performing any one among the wireless communication and the wireless broadcasting, using the indicated frequency until elapse of the interval indicated by the third information transmitted the control apparatus, and
updating the frequency information by the control apparatus, the control apparatus updating the frequency information based on fourth information indicating for each frequency, an interference level of radio waves in a radio apparatus group that includes the radio apparatus, the control apparatus updating the frequency information such that the wireless schemes correlated with a given frequency for which the interference level exceeds a given level are decreased, wherein
the extracting and transmitting by the control apparatus includes the control apparatus extracting from the updated frequency information, the frequency that corresponds to the wireless scheme indicated by the first information transmitted by the radio apparatus and transmitting to the radio apparatus, the second information indicating the extracted frequency.

2. The communications method according to claim 1, wherein
the updating of the frequency information by the control apparatus includes the control apparatus updating the frequency information such that the decreased wireless schemes correlated with the given frequency for which the interference level exceeded the given level are reinstated, when based on the third fourth information indicating the interference level, the interference level of the given frequency for which the interference level exceeded the given level has dropped below the given level, and
the extracting and transmitting by the control apparatus includes the control apparatus extracting from the updated frequency information, the frequency that corresponds to the wireless scheme indicated by the first information transmitted by the radio apparatus and transmitting to the radio apparatus, the second information indicating the extracted frequency.

3. The communications method according to claim 1, wherein the updating by the control apparatus includes the control apparatus updating the frequency information such that a wireless scheme that is selected from among the wireless schemes correlated with the given frequency for which the interference level exceeds the given level and that is selected based on a count of wireless terminals using the wireless scheme among the radio apparatus group, cannot be used.

4. The communications method according to claim 1, further comprising refraining from decreasing the wireless schemes by the control apparatus, the control apparatus refraining from decreasing the wireless schemes correlated with the given frequency for which the interference level exceeds the given level, when among the wireless schemes correlated with the given frequency for which the interference level exceeds the given level, no wireless scheme is present for which a ratio of a count of wireless terminals using the wireless scheme to a count of the wireless terminals in the radio apparatus group exceeds a threshold.

5. The communications method according to claim 4, wherein the updating by the control apparatus includes the control apparatus updating the frequency information such that among the wireless schemes correlated with the given frequency for which the interference level exceeds the given level, one wireless scheme alone can be used, and the threshold is a threshold corresponding to a count of frequencies available for the one wireless scheme alone, in the frequency information.

6. A communications system comprising:

a radio apparatus configured to transmit first information indicating a wireless scheme that the radio apparatus can use in any one among wireless communication and wireless broadcasting; and a control apparatus configured to extract from frequency information correlating wireless schemes and available frequencies, a frequency that corresponds to the wireless scheme indicated by the first information transmitted by the radio apparatus, the control apparatus further configured to transmit to the radio apparatus, second information indicating the extracted frequency and third information indicating an interval during which the extracted frequency is available, wherein the radio apparatus performs any one among the wireless communication and the wireless broadcasting, using the frequency indicated by the second information until elapse of the interval indicated by the third information transmitted by the control apparatus, and the control apparatus further configured to update the frequency information based on fourth information indicating for each frequency, an interference level of radio waves in a radio apparatus group that includes the radio apparatus, the control apparatus updates the frequency information such that the wireless schemes correlated with a given frequency for which the interference level exceeds a given level are decreased, wherein the control apparatus is configured to extract from the updated frequency information, the frequency that corresponds to the wireless scheme indicated by the first information transmitted by the radio apparatus and transmit to the radio apparatus, the second information indicating the extracted frequency.

7. A control apparatus comprising:

a receiving circuitry configured to receive first information indicating a wireless scheme that can be used by a radio apparatus in any one among wireless communication and wireless broadcasting;

an extracting circuitry configured to extract from frequency information correlating wireless schemes and available frequencies, a frequency that corresponds to the wireless scheme indicated by the first information received by the receiving circuitry; and a transmitting circuitry configured to transmit to the radio apparatus, second information indicating the frequency extracted by the extracting circuitry and third information indicating an interval during which the extracted frequency is available, and the control apparatus further configured to update the frequency information based on fourth information indicating for each frequency, an interference level of radio waves in a radio apparatus group that includes the radio apparatus, the control apparatus updates the frequency information such that the wireless schemes correlated with a given frequency for which the interference level exceeds a given level are decreased, wherein the extracting circuitry is configured to extract from the updated frequency information, the frequency that corresponds to the wireless scheme indicated by the first information transmitted by the radio apparatus and the transmitting circuitry is configured to transmit to the radio apparatus, the second information indicating the extracted frequency.

8. A radio apparatus comprising:

a transmitting circuitry configured to transmit to a control apparatus, first information indicating a wireless scheme that can be used by the radio apparatus in any one among wireless communication and wireless broadcasting;

a receiving circuitry configured to receive from the control apparatus, second information indicating a frequency corresponding to the wireless scheme indicated by the first information transmitted by the transmitting circuitry, the frequency being extracted by the control apparatus, from frequency information correlating wireless schemes and available frequencies; and a radio circuitry configured to perform any one among the wireless communication and the wireless broadcasting using the frequency indicated by the information received by the receiving circuitry, wherein the receiving circuitry is further configured to receive from the control apparatus, third information indicating an interval during which the extracted frequency is available; and the radio circuitry is further configured to use the indicated frequency until elapse of the interval indicated by the third information received from the control apparatus, wherein the control apparatus is configured to update the frequency information based on fourth information indicating for each frequency, an interference level of radio waves in a radio apparatus group that includes the radio apparatus, the control apparatus updates the frequency information such that the wireless schemes correlated with a given frequency for which the interference level exceeds a given level are decreased, wherein the control apparatus is configured to extract from the updated frequency information, the frequency that corresponds to the wireless scheme indicated by the first information transmitted by the radio apparatus and transmit to the radio apparatus, the second information indicating the extracted frequency.

\* \* \* \* \*